(No Model.)
C. B. ROHLAND.
BORING AND CHASING TOOL.
No. 455,640. Patented July 7, 1891.
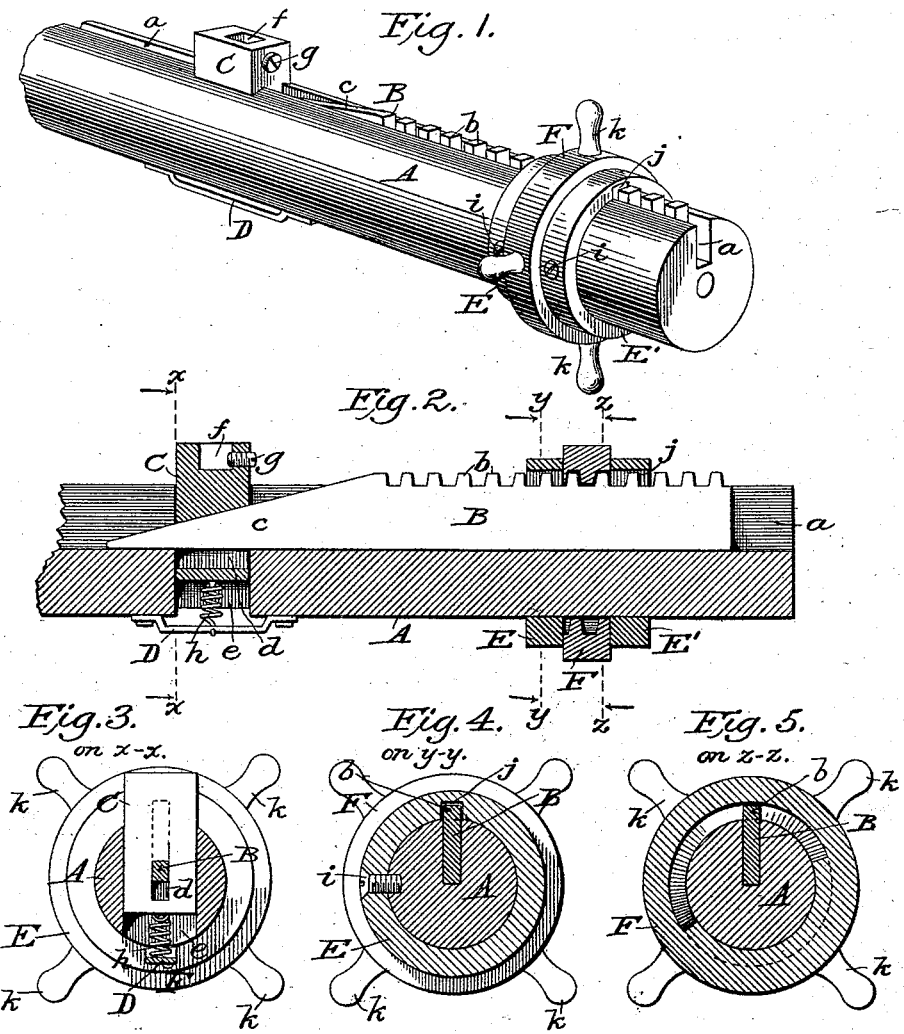
C. B. ROHLAND,
Inventor
by his Attorneys,
Dodge Sons.
Witness:
James F. Duhamel
Horace A. Dodge.

UNITED STATES PATENT OFFICE.

CHARLES B. ROHLAND, OF NEW PORTAGE, OHIO.

BORING OR CHASING TOOL.

SPECIFICATION forming part of Letters Patent No. 455,640, dated July 7, 1891.

Application filed March 25, 1891. Serial No. 386,372. (No model.)

*To all whom it may concern:*

Be it known that I, CHARLES B. ROHLAND, a citizen of the United States, residing at New Portage, in the county of Summit and State of Ohio, have invented certain new and useful Improvements in Boring or Chasing Tools, of which the following is a specification.

My invention relates to devices for boring or chasing; and it consists in a novel construction and arrangement of devices whereby the block carrying the boring or chasing tool may be projected laterally or radially with reference to the bar in which said block is mounted.

In the drawings, Figure 1 is a perspective view of my improved device; Fig. 2, a longitudinal sectional view of the same; and Figs. 3, 4, and 5 transverse sectional views on the lines $x$ $x$, $y$ $y$, and $z$ $z$, respectively.

A indicates a bar or shaft provided with a longitudinal slot $a$, extending from end to end or throughout the greater part of the length of the said bar or shaft.

B indicates a bar which is adapted to slide freely lengthwise in the slot $a$, said bar having a series of teeth $b$ on one edge, which project outwardly beyond the periphery of the bar or shaft A, as shown in Figs. 1, 2, 4, and 5. This bar B is further provided with a beveled or tapered end $c$, as shown in Figs. 1 and 2, which is designed to enter a corresponding opening $d$, formed in the tool block or carrier C, as shown in Figs. 2 and 3.

The tool block or carrier C works through a transverse or radial opening $e$, formed in the stock or shaft or body A, and projects laterally therefrom, as shown in Figs. 1, 2, and 3. At one end the tool block or carrier is provided with a socket or seat $f$ to receive the chasing or other tool, (not shown,) said tool being held in position within the block or carrier by means of a set-screw $g$ or in any equivalent manner.

D indicates a bridge-piece secured to the shaft or stock B over the opening $e$, and $h$ indicates a coiled spring attached at one end to the bridge-piece and at the other end to the tool block or carrier C, and serving to draw the said tool-block toward the bridge-piece.

E E' indicate collars, which are rigidly affixed to the bar, stock, or shaft A by means of set-screws $i$, Figs. 1 and 4, said collars being notched or cut away on their inner faces, as at $j$, so as to permit the teeth of the bar B to pass freely therethrough, as shown in Figs. 1, 2, and 4. Between the collars E E', which are separated a distance, as shown, is mounted an internally-threaded nut or collar F, provided with knobs $k$, or other suitable means, by which it may be turned or rotated. The threads formed upon this collar or nut engage the teeth $b$ of the longitudinally-moving bar B, and hence when the said collar or nut is turned or rotated the said bar B will be moved in one or the other directions, according to the direction of rotation of the nut or collar F, which latter is prevented from end movement by means of the collars E E'. When the collar or nut F is turned or rotated in one direction, the bar B will be withdrawn to a greater or less extent from the tool block or carrier C, and the spring $h$, connecting said tool block or carrier with the bridge-piece, will draw the tool-block inward. When, however, the collar or nut is turned in the opposite direction, the bar B will be moved through the tool block or carrier, and its inclined or beveled nose $c$ will, acting upon the correspondingly-inclined wall of the hole or opening $d$, force said tool block or carrier outward laterally or radially with reference to the shaft, bar, or stock A.

It will be noticed upon reference to Fig. 2 that the tool-block has a firm bearing upon the reciprocating bar B, and that when the shaft, bar, or stock A is turned or rotated the said tool block or carrier will be prevented from moving away from its work.

Having thus described my invention, what I claim is—

1. In combination with the slotted shaft having a transverse opening, a tool-block mounted in the opening, a bar mounted within the slot and engaging the block, and means for reciprocating the bar.

2. In combination with the slotted shaft having a transverse opening, a tool-block mounted in the opening, a toothed bar mounted within the slot and having a tapered or beveled nose to engage the block, and a nut journaled upon the shaft and engaging the toothed bar.

3. In combination with the slotted shaft having a transverse opening, a tool-block mounted in the opening, a toothed bar having a beveled nose to enter an opening in the tool-block, fixed collars applied to the shaft, and a nut journaled upon the shaft between the collars and engaging the toothed bar.

4. In combination with the slotted shaft having a transverse opening, a tool-block mounted within the opening, a reciprocating bar adapted to force the block outward, and a spring acting in opposition to the bar.

In witness whereof I hereunto set my hand in the presence of two witnesses.

C. B. ROHLAND.

Witnesses:
E. ELLSWORTH,
H. R. McCULLOUGH.